(12) United States Patent
Alanen et al.

(10) Patent No.: US 8,717,235 B2
(45) Date of Patent: May 6, 2014

(54) METHOD AND APPARATUS FOR NAVIGATION SYSTEMS

(75) Inventors: Kimmo Alanen, Lempaala (FI); Jari Syrjarinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/412,186

(22) Filed: Mar. 5, 2012

(65) Prior Publication Data

US 2012/0206298 A1    Aug. 16, 2012

Related U.S. Application Data

(62) Division of application No. 11/574,481, filed as application No. PCT/FI2006/050083 on Feb. 28, 2006, now Pat. No. 8,154,442.

(51) Int. Cl.
*G01S 19/20* (2010.01)
*G01S 19/25* (2010.01)
*G01S 19/32* (2010.01)

(52) U.S. Cl.
CPC ............... *G01S 19/20* (2013.01); *G01S 19/25* (2013.01); *G01S 19/32* (2013.01)
USPC ............. 342/357.58; 342/357.64; 342/357.72

(58) Field of Classification Search
CPC ................. G01S 19/25; G01S 19/32
USPC ........................ 342/357.58, 357.64, 357.72
See application file for complete search history.

(56) References Cited

U.S. PATENT DOCUMENTS

| 5,440,582 A | 8/1995 | Birchler et al. |
| 6,336,076 B1 | 1/2002 | Farley et al. |
| 6,429,808 B1 * | 8/2002 | King et al. ............... 342/357.44 |
| 6,429,811 B1 | 8/2002 | Zhao et al. |

(Continued)

FOREIGN PATENT DOCUMENTS

| CN | 1721872 | 1/2006 |
| EP | 1617231 | 1/2006 |

(Continued)

OTHER PUBLICATIONS

"Introduction to GNSS," Document # G2-050074, 3GPP TSG GERAN2 #23bis, Helsinki, Finland, Mar. 7-11, 2004, Alcatel.*

(Continued)

*Primary Examiner* — Gregory C Issing
(74) *Attorney, Agent, or Firm* — Locke Lord LLP

(57) ABSTRACT

The invention relates to a network element comprising a controlling element for forming assistance data relating to two or more signals transmitted by a reference station of at least one navigation system; and a transmitter for transmitting the assistance data via a communications network to a device. The device comprises a positioning receiver for performing positioning on the basis of two or more signals transmitted by a reference station of the at least one satellite navigation system; a receiver for receiving the assistance data from the network element; and an examining element configured to examine the received assistance data to find out information relating to the status of the two or more signals. The information comprises indication on the reference station the signal relates to, and the status indicates the usability of the signal.

9 Claims, 6 Drawing Sheets

(56) References Cited

U.S. PATENT DOCUMENTS

| | | |
|---|---|---|
| 6,583,756 B2 | 6/2003 | Sheynblat |
| 6,603,426 B1 | 8/2003 | Clark |
| 6,992,617 B2 | 1/2006 | Diggelen et al. |
| 7,064,706 B2 | 6/2006 | King et al. |
| 7,242,348 B2 | 7/2007 | Nagahara |
| 7,574,215 B1 | 8/2009 | Fan et al. |
| 8,154,442 B2 | 4/2012 | Alanen et al. |
| 2004/0201521 A1* | 10/2004 | Alvarez et al. ............ 342/357.12 |
| 2004/0248559 A1* | 12/2004 | Trautenberg ................ 455/412.1 |
| 2005/0090265 A1* | 4/2005 | Abraham .................... 455/456.1 |

FOREIGN PATENT DOCUMENTS

| | | |
|---|---|---|
| GB | 2358977 | 8/2001 |
| JP | 2006029914 | 2/2006 |
| RU | 2073913 | 2/1997 |
| TW | M281892 Y | 12/2005 |
| WO | WO0111382 | 2/2001 |
| WO | WO02067462 | 8/2002 |
| WO | WO2004042417 | 5/2004 |
| WO | WO2005008273 | 1/2005 |

OTHER PUBLICATIONS

"3rd Generation Partnership Project; Technical Specification Group Services and System Aspects; Location Services (LCS); Study into Applicability of Galileo in LCS Release 6; 3GPP TR 23.835" ETSI Standard, LIS, Sophia Antipolis Cedex, France, No. V1.0.0, Jun. 1, 2003, XP014021948, ISSN: 0000-0001.

Monnerat M. et al: "The Assisted GNSS, Technology and Applications" Ion GNSS. International Technical Meeting of the Satellite Division of the Institute of Navigation, Washington, DC, US, Sep. 21, 2004, pp. 2479-2488, XP002366445.

European Supplementary Search Report of European Application No. EP 06 70 8987—Date of Completion of Search: Dec. 11, 2009, 6 pages.

Singapore Search and Examination Report of Singapore Application No. 200806172-3—Date of Completion of Search: May 27, 2010, 10 pages.

Search Report of TW Patent Application No. 96104817—Date of Completion: Jan. 2, 2013—1 page.

Machine translation of Abstract for Taiwanese Publication No. TWM281892Y—1 page.

Busic, L., et al., "Assisted Satellite Positioning", 47th International Symposium ELMAR—2005, Jun. 8-10, 2005, pp. 263-267.

\* cited by examiner

METHOD AND APPARATUS FOR NAVIGATION SYSTEMS

This application is a divisional of U.S. application Ser. No. 11/574,481 filed Dec. 16, 2008, which is incorporated herein by reference, and which issued as U.S. Pat. No. 8,154,442 on Apr. 10, 2012, which is a National Stage of International Application No. PCT/FI2006/050083, International Filing Date Feb. 28, 2006, which designated the United States of America, and which published as WO 2007/099195 on Sep. 7, 2007.

FIELD OF THE INVENTION

This invention relates to a field of assisted navigation systems and more specifically to a format, in which information relating to the health of the satellites is distributed from a communications network to terminals. The invention also relates to a device comprising a positioning receiver for performing positioning on the basis of one or more signals of a satellite navigation system. The invention also relates to a network element comprising a transmitter for transmitting assistance data of a satellite navigation system to a receiver. The invention further relates to methods for delivering assistance data of a satellite navigation system to a device and method for using the assistance data in the positioning of the device. The invention still relates to a module, computer program product, a signal, a carrier having a signal recorded thereon and an assistance data server.

BACKGROUND OF THE INVENTION

One known navigation system is the GPS system (Global Positioning System) which presently comprises more than 20 satellites, of which, usually, a half of them are simultaneously within the sight of a receiver. These satellites transmit e.g. Ephemeris data of the satellite, as well as data on the time of the satellite. A receiver used in positioning normally deduces its position by calculating the propagation time of a signal received simultaneously from several satellites belonging to the positioning system to the receiver and calculates the time of transmission (ToT) of the signals. For the positioning, the receiver must typically receive the signal of at least four satellites within sight to compute the position. The other already launched navigation system is the Russian-based GLONASS.

In the future, there will also exist other satellite based navigation systems than GPS and GLONASS. In the Europe the Galileo system is under construction and will be launched within a few years. Space Based Augmentation Systems SBAS (WAAS, EGNOS, GAGAN) are also being ramped up. Local Area Augmentation Systems LAAS, which uses fixed navigation stations on the ground, are becoming more common. Strictly speaking, the Local Area Augmentation Systems are not actually satellite based navigation systems although the navigation stations are called as "pseudo satellites" or "pseudolites". The navigation principles applicable with the satellite based systems are also applicable with the Local Area Augmentation Systems. Pseudolite signals can be received with a standard GNSS receiver. Moreover, Japanese are developing their own GPS complementing system called Quasi-Zenith Satellite System QZSS.

The satellite based navigation systems, including systems using pseudo satellites, can collectively be called as Global Navigation Satellite Systems (GNSS). In the future there will probably be positioning receivers which can perform positioning operations using, either simultaneously or alternatively, more than one navigation system. Such hybrid receivers can switch from a first system to a second system if e.g. signal strengths of the first system fall below a certain limit, or if there are not enough visible satellites of the first system, or if the constellation of the visible satellites of the first system is not appropriate for positioning. Simultaneous use of different system comes into question in challenging conditions, such as urban areas, where there is limited number of satellites in view. In such cases, navigation based on only one system is practically impossible due to the low availability of signals. However, hybrid use of different navigation systems enables navigation in these difficult signal conditions.

Each satellite of the GPS system transmits a ranging signal at a carrier frequency of 1575.42 MHz called L1. This frequency is also indicated with $154f_0$, where $f_0$=10.23 MHz. Furthermore, the satellites transmit another ranging signal at a carrier frequency of 1227.6 MHz called L2, i.e. $120f_0$. In the satellite, the modulation of these signals is performed with at least one pseudo random sequence. This pseudo random sequence is different for each satellite. As a result of the modulation, a code-modulated wideband signal is generated. The modulation technique used makes it possible in the receiver to distinguish between the signals transmitted from different satellites, although the carrier frequencies used in the transmission are substantially the same. Doppler effect results in a small (±5 kHz) change in the carrier frequency depending upon the constellation geometry. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with a polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible to produce different C/A codes with an identical code generator. The C/A codes are thus binary codes whose chipping rate in the GPS system is 1.023 MHz. The C/A code comprises 1023 chips, wherein the code epoch is 1 ms. The L1 carrier signal is further modulated with navigation information at a bit rate of 50 bit/s. The navigation information comprises information about the health of the satellite, its orbit, clock behaviour, etc.

In the GPS system, satellites transmit navigation messages including Ephemeris data and time data, which are used in the positioning receiver to determine the position of the satellite at a given instant. These Ephemeris data and time data are transmitted in frames which are further divided into subframes. FIG. 6 shows an example of such a frame structure FR. In the GPS system, each frame comprises 1500 bits which are divided into five subframes of 300 bits each. Since the transmission of one bit takes 20 ms, the transmission of each subframe thus takes 6 s, and the whole frame is transmitted in 30 seconds. The subframes are numbered from 1 to 5. In each subframe 1, e.g. time data is transmitted, indicating the moment of transmission of the subframe as well as information about the deviation of the satellite clock with respect to the time in the GPS system.

The subframes 2 and 3 are used for the transmission of Ephemeris data. The subframe 4 contains other system information, such as universal time, coordinated (UTC). The subframe 5 is intended for the transmission of almanac data on all the satellites. The entity of these subframes and frames is called a GPS navigation message which comprises 25 frames, or 125 subframes. The length of the navigation message is thus 12 min 30 s.

In the GPS system, time is measured in seconds from the beginning of a week. In the GPS system, the moment of beginning of a week is midnight between a Saturday and a Sunday. Each subframe to be transmitted contains information on the moment of the GPS week when the subframe was transmitted. Thus, the time data indicates the moment of transmission of a certain bit, i.e. in the GPS system, the moment of transmission of the last bit in the subframe. In the satellites, time is measured with high-precision atomic chronometers. In spite of this, the operation of each satellite is controlled in a control centre for the GPS system (not shown), and e.g. a time comparison is performed to detect chronometric errors in the satellites and to transmit this information to the satellite.

During their operation, the satellites monitor the condition of their equipment. The satellites may use for example so-called watchdog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. The malfunctioning satellite sets a flag in a satellite health field of a navigation message indicative of a failure of the satellite. It is also possible that a Control Segment of a Satellite Navigation System detects abnormalities in the operation of a satellite or in signals of a satellite. Hence, the Control Segment can also set a non-healthy indication for such a satellite. This indication can also be set when a satellite is tested or during a possible correction operation of the orbit of the satellite.

It is also possible to detect abnormalities in the operation of a satellite by examining signals transmitted by a satellite. For example, an observing station may perform measurements of residuals of a pseudorange and if the residual deviates from a computational residual more than a predetermined threshold, the observing station determines that the satellite is not operating properly. Another option is to compare the accuracy of the ephemeris data transmitted by a satellite to a reference data.

The number of satellites, the orbital parameters of the satellites, the structure of the navigation messages, etc. may be different in different navigation systems. Therefore, the operating parameters of a GPS based positioning receiver may not be applicable in a positioning receiver of another satellite system. On the other hand, at least the design principles of the Galileo has indicated that there will be some similarities between GPS and Galileo in such a way that at least Galileo receiver should be able to utilize GPS satellite signals in positioning.

Positioning devices (or positioning receivers) i.e. devices which have the ability to perform positioning on the basis of signals transmitted in a navigation system can not always receive strong enough signals from the required number of satellites. For example, it may occur that when a three-dimensional positioning should be performed by the device, it can not receive signals from four satellites. This may happen indoors, in urban environments, etc. Methods and systems have been developed for communications networks to enable position in adverse signal conditions. If the communications network only provides navigation model assistance to the receiver, the requirement for a minimum of three signals in two-dimensional positioning or four signals in three-dimensional positioning does not diminish. However, if the network provides, for instance, barometric assistance, which can be used for altitude determination, then three satellites is enough for three-dimensional positioning assuming the positioning receiver has access to barometric measurements (e.g. from an integrated barometer). These so called assisted navigation systems utilise other communication systems to transmit information relating to satellites to the positioning devices. Respectively, such positioning devices which have the ability to receive and utilize the assistance data can be called as assisted GNSS receivers, or more generally, assisted positioning devices.

Currently, only assistance data relating to GPS satellites can be provided to assisted GNSS receivers in CDMA (Code Division Multiple Access), GSM (Global System for Mobile communications) and W-CDMA (Wideband Code Division Multiple Access) networks. This assistance data format closely follows the GPS navigation model specified in the GPS-ICD-200 SIS (SIS, Signal-In-Space) specification. This navigation model includes a clock model and an orbit model. To be more precise, the clock model is used to relate the satellite time to the system time, in this case the GPS time. The orbit model is used to calculate the satellite position at a given instant. Both data are essential in satellite navigation.

The availability of the assistance data can greatly affect the positioning receiver performance. In the GPS system, it takes at least 18 seconds (the length of the first three subframes) in good signal conditions for a GPS receiver to extract a copy of the navigation message from the signal broadcasted by a GPS satellite. Therefore, if no valid copy (e.g. from a previous session) of a navigation model is available, it takes at least 18 second before the GPS satellite can be used in position calculation. Now, in AGPS receivers (Assisted GPS) a cellular network such as GSM or UMTS (Universal Mobile Telecommunications System) sends to the receiver a copy of the navigation message and, hence, the receiver does not need to extract the data from the satellite broadcast, but can obtain it directly from the cellular network. The time to first fix (TTFF) can be reduced to less than 18 seconds. This reduction in the time to first fix may be crucial in, for instance, when positioning an emergency call. This also improves user experience in various use cases, for example when the user is requesting information of services available nearby the user's current location. These kind of Location Based Services (LBS) utilize in the request the determined location of the user. Therefore, delays in the determination of the location can delay the response(s) from the LBS to the user.

Moreover, in adverse signal conditions the utilization of the assisted data may be the only option for navigation. This is because a drop in the signal power level may make it impossible for the GNSS receiver to obtain a copy of the navigation message. However, when the navigation data is provided to the receiver from an external source (such as a cellular network), navigation is enabled again. This feature can be important in indoor conditions as well as in urban areas, where signal levels may significantly vary due to buildings and other obstacles, which attenuate satellite signals.

When a mobile terminal having an assisted positioning receiver requests for assistance data, the network sends the mobile terminal one navigation model for each satellite in the view of the assisted positioning receiver. The format in which the assistance data is sent is specified in various standards. Control Plane solutions include RRLP (Radio Resource Location Services Protocol) in GSM, RRC (Radio Resource Control) in W-CDMA and IS-801.1/IS-801.A in CDMA. Broadcast assistance data information elements are defined in the standard TS 44.035 for GSM. Finally, there are User Plane solutions OMA SUPL 1.0 and various proprietary solutions for CDMA networks. The common factor for all these solutions is that they only support GPS. However, due to the ramp up of Galileo, all the standards shall be modified in the near future in order to achieve Galileo compatibility.

The international patent application publication WO 02/67462 discloses GPS assistance data messages in cellular communications networks and methods for transmitting GPS assistance data in cellular networks.

The navigation systems index the satellites to express the satellite the information relates to. This is called as satellite indexing. The satellite index is used to identify the navigation model with a specific satellite. Every navigation system has its own indexing method.

GPS indexes satellites (SV, Space Vehicle) based on PRN (PseudoRandom Noise) numbers. The PRN number can be identified with the CDMA spread code used by the satellites.

Galileo uses a 7-bit field (1-128) to identify the satellite. The number can be identified with the PRN code used by the satellite.

GLONASS uses a 5-bit field to characterize satellites. The number can be identified with the satellite position in the orbital planes (this position is called a "slot"). Moreover, in contrast to other systems, GLONASS uses FDMA (Frequency Division Multiple Access) to spread satellite broadcasts in spectrum. It is noted here that there is also a CDMA spread code in use in the GLONASS. There is, therefore, a table that maps the satellite slot number to the broadcast frequency. This map must be included in any assistance data format.

SBAS systems use PRN numbers similar to GPS, but they have an offset of 120. Therefore, the first satellite of the SBAS system has a satellite number of 120.

Since QZSS SIS ICD is not public yet, there is no detailed information on the satellite indexing in the system. However, since the system is a GPS augmentation, the GPS compatible format should at high probability be compatible with QZSS as well.

Pseudolites (LAAS) are the most problematic in the indexing sense. There is no standard defined for indexing pseudolites currently.

However, the indexing should at least loosely follow the GPS-type indexing, since they use GPS-type PRNs. Therefore, by ensuring that the range of satellite indices is sufficient, it should be possible to describe LAAS transmitters with GPS-type satellite indexing.

In addition to these requirements (indexing, clock model and orbit model), the navigation model must include information on model reference time ($t_{REFERENCE}$ in the clock model, similar time stamp is required for the orbit model), model validity period, issue of data (in order to be able differentiate between model data sets), SV health (indicates whether navigation data from the SV is usable or not).

The current satellite health field requires modification, since in the future GPS (and other systems) do not transmit only one signal, but various signals at different frequencies. Then, it is possible that one of these signals is unusable, but others are fine. Then, the satellite health must be able to indicate this mode of malfunction. Current solution in GPS is only able to express malfunction is some signal (without specifying which one). The problem was previously solved only by saying that the whole satellite is broken and not just some specific signal.

SUMMARY OF THE INVENTION

The current invention is that instead of specifying that some particular satellite is broken, a list of specific broken signals that the particular satellite transmits is provided. If the whole satellite is broken, then there is a special value for marking any signal broken for that particular satellite. The approach can be used at least with GPS, Galileo, GLONASS, SBAS, LAAS and QZSS. There are also reservations for yet unknown future systems.

According to a first aspect of the present invention there is provided a device comprising
    a positioning receiver for performing positioning on the basis of one or more signals transmitted by reference stations of at least one satellite navigation system;
    a receiver for receiving assistance data relating to at least one navigation system; and
    an examining element adapted to examine the received assistance data;
characterised in that said examining element adapted to examine the assistance data to find out information relating to the status of said one or more signals of the reference stations of the navigation system, said information relating to the status of said one or more signals of the reference stations comprising indication on the reference station the signal relates to, and said status indicating the usability of the signal, wherein the device is adapted not to use in the positioning such a signal which is indicated not to be usable.

According to a second aspect of the present invention there is provided a network element comprising
    a controlling element for forming assistance data relating to one or more reference stations of at least one navigation system; and
    a transmitting element for transmitting assistance data to a communications network;
characterised in that the network element further comprises
    an examining element adapted to examine the status of said one or more signals of the reference stations of the navigation system to determine the usability of the signal in a positioning of a device;
wherein the controlling element is adapted to
    insert, for each signal the examining element determined not to be usable in a positioning of the device, an indication on the non-usability of the signal, said indication comprising information on the signal and on the reference station the signal relates to into the assistance data.

According to a third aspect of the present invention there is provided a system comprising:
    network element which comprises
        a controlling element for forming assistance data relating to one or more reference stations of at least one navigation system; and
        a transmitting element for transmitting assistance data to a communications network;
    a device which comprises
        a positioning receiver for performing positioning on the basis of one or more signals transmitted by reference stations of said at least one satellite navigation system;
        a receiver for receiving said assistance data from the communications network; and
        an examining element adapted to examine the received assistance data;
characterised in that the network element of the system further comprises
    an examining element adapted to examine the received navigation data to find out information relating to the status of said one or more signals of the reference stations of the navigation system, said information relating to the status of said one or more signals of the reference stations comprising indication on the reference station the signal relates to, and said status indicating the usability of the signal;

wherein the controlling element is adapted to
   insert, for each signal the examining element determined not to be usable in a positioning of a device, an indication on the non-usability of the signal, said indication comprising information on the signal and on the reference station the signal relates to into the assistance data;

and that said examining element of the device is adapted to examine the assistance data to find out information relating to the status of said one or more signals of the reference stations of the navigation system, said information relating to the status of said one or more signals of the reference stations comprising indication on the reference station the signal relates to, and said status indicating the usability of the signal, wherein the device is adapted not to use in the positioning such a signal which is indicated not to be usable.

According to a fourth aspect of the present invention there is provided a module for a device, the device comprising
   a positioning receiver for performing positioning on the basis of one or more signals transmitted by reference stations of at least one satellite navigation system; and
   a receiver for receiving assistance data from a communications network;
wherein the module comprises an examining element adapted to examine the received assistance data;
characterised in that said examining element is adapted to examine the assistance data to find out information relating to the status of said one or more signals of the reference stations of the navigation system, said information relating to the status of said one or more signals of the reference stations comprising indication on the reference station the signal relates to, and said status indicating the usability of the signal, wherein the module further comprises an output to transfer to the positioning receiver an indication on such a signal which is indicated not to be usable.

According to a fifth aspect of the present invention there is provided a method for transmitting assistance data to a device, the method comprising:
   forming assistance data relating to one or more reference stations of at least one navigation system; and
   transferring the assistance data to the device;
characterised in that the method further comprises
   examining the status of said one or more signals of the reference stations of the navigation system to determine the usability of the signal in a positioning of a device; and
   inserting, for each signal the examining indicated not to be usable in a positioning of the device, an indication on the non-usability of the signal, said indication comprising information on the signal and on the reference station the signal relates to into the assistance data.

According to a sixth aspect of the present invention there is provided a method for using assistance data in a positioning of a device, the method comprising:
   receiving assistance data relating to one or more reference stations of at least one navigation system;
characterised in that the method further comprises
   examining the received assistance data to find out information relating to the status of said one or more signals of the reference stations of the navigation system, said information relating to the status of said one or more signals of the reference stations comprising indication on the reference station the signal relates to, and said status indicating the usability of the signal; and leaving out such a signal, which is indicated not to be usable, from signals to be used in a positioning of the device.

According to a seventh aspect of the present invention there is provided a computer program product for storing computer program having computer executable instructions for
   forming assistance data relating to one or more reference stations of at least one navigation system; and
   transferring the assistance data to a device;
characterised in that the computer program further comprises computer executable instructions for
   examining the status of said one or more signals of the reference stations of the navigation system to determine the usability of the signal in a positioning of a device;
   inserting, for each signal the examining indicated not to be usable in a positioning of the device, an indication on the non-usability of the signal, said indication comprising information on the signal and on the reference station the signal relates to into the assistance data.

According to a eighth aspect of the present invention there is provided a computer program product for storing computer program having computer executable instructions for
   receiving assistance data relating to one or more reference stations of at least one navigation system;
characterised in that the computer program further comprises computer executable instructions for
   examining the received assistance data to find out information relating to the status of said one or more signals of the reference stations of the navigation system, said information relating to the status of said one or more signals of the reference stations comprising indication on the reference station the signal relates to, and said status indicating the usability of the signal; and
leaving out such a signal, which is indicated not to be usable, from signals to be used in a positioning of the device.

According to a ninth aspect of the present invention there is provided a signal for delivering assistance data to a device, the signal comprising
   assistance data relating to one or more reference stations of at least one navigation system;
characterised in that the signal further comprises, for each signal of a reference station not usable in positioning, an indication on the non-usability of the signal, said indication comprising information on the signal and on the reference station the signal relates to.

According to a tenth aspect of the present invention there is provided a a carrier having a signal recorded thereon for delivering assistance data to a device, the signal comprising
   assistance data relating to one or more reference stations of at least one navigation system;
characterised in that the signal further comprises, for each signal of a reference station not usable in positioning, an indication on the non-usability of the signal, said indication comprising information on the signal and on the reference station the signal relates to.

According to a eleventh aspect of the present invention there is provided an assistance data server comprising
   a controlling element for forming assistance data elating to one or more reference stations of at least one navigation system; and
   a transmitting element for transmitting the assistance data to a communications network;
characterised in that the assistance data server further comprises
   an examining element adapted to examine the status of said one or more signals of the reference stations of the navigation system to determine the usability of the signal in a positioning of a device, wherein the controlling element is adapted to insert, for each signal the examining element determined not to be usable in a positioning of a device, an indication on the non-usability of the signal, said indication comprising information on the signal and on the reference station the signal relates to into the assistance data.

The invention shows some advantages over prior art. In those cases where only some specific signal is broken, the other signals that the particular satellite transmits are still usable and therefore there is going to be more usable signals and therefore the availability of the A-GNSS service can be improved.

DESCRIPTION OF THE DRAWINGS

In the following, the invention will be described in more detail with reference to the appended drawings, in which.

DETAILED DESCRIPTION OF THE INVENTION

Figure 1:
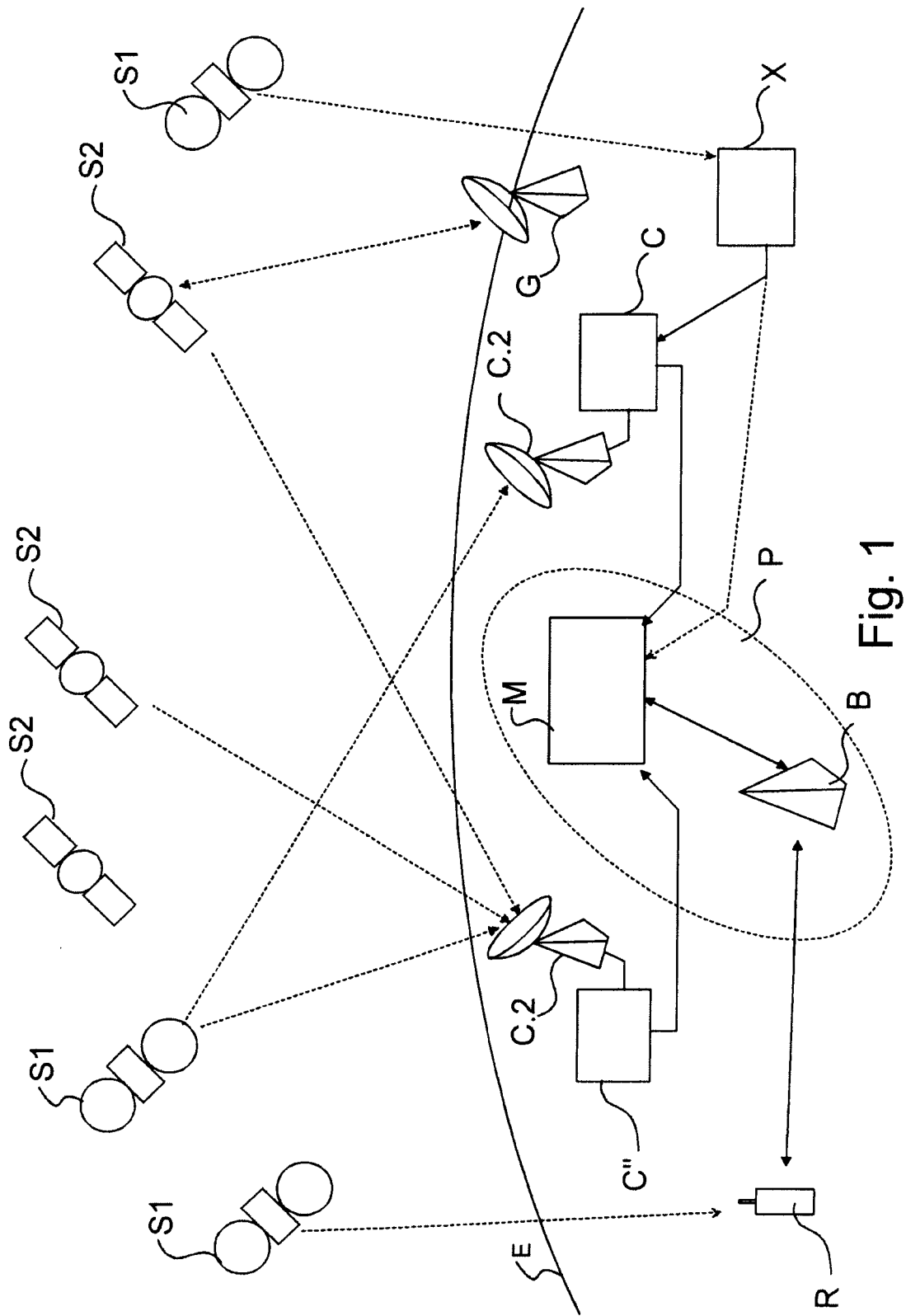
FIG. 1 depicts as a general, simplified diagram a system in which the present invention can be applied.

In FIG. 1 there is depicted an example of a system 1 which can be used for positioning a device R. The system 1 comprises reference stations S, such as satellites S1 of a first navigation system, for example the GPS, and satellites S2 of a second navigation system, for example the GLONASS. It should be noted here that GPS and GLONASS are only mentioned as non-limiting examples here and also other reference stations S than satellites can be used (e.g. pseudolites of the LAAS). Also the number of reference stations is greater than shown in FIG. 1. The navigation systems comprise one or more ground stations G. The ground station G controls the operation of the satellites S1, S2 of the navigation systems 2, 3, respectively. The ground station G can e.g. determine deviations of the orbits of the satellites and the accuracy of the clock(s) of the satellites (not shown). If the ground station G detects a need to correct the orbit or the clock of a satellite S1, S2, it transmits a control signal (or control signals) to the satellite S1, S2 which then performs a correction operation on the basis of the control signal(s). In other words, the ground station G refers to the Ground Segment of the navigation system.

During their operation, the satellites S1, S2 monitor the condition of their equipment. The satellites S1, S2 may use, for example, watchdog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. The malfunctioning satellite S1, S2 sets a flag in a satellite health field of a navigation message indicative of a failure of the satellite. The satellite S1,S2 can also indicate in the navigation message a signal or signals which is/are not operating properly. It is also possible that the ground station G can detect that some satellite is not operating properly and set an indication of the malfunctioning signal(s) of that satellite. This indication can then be transmitted to the communications network P in a navigation message.

In this non-limiting example embodiment the communications network P is the GSM network and the network element M communicating with the reference receiver C.2 is the Serving Mobile Location Centre (SMLC) of the GSM network. The reference receiver C.2 can transmit assistance data to the network element M. The network element stores the assistance data to a memory M.4 (FIG. 3) for transmission to a device R when the device R needs the assistance data to perform assisted positioning operation. It is also possible to transmit the assistance data from the network element M to the device R before it is needed. For example, the device R can request the assistance data of all visible satellites and store the navigation data to the memory R.4 of the device R for later use.

The network element M can also be the Serving Mobile Location Centre (SMLC) of the GSM network. The Serving Mobile Location Centre is either a separate network element (such as the MSC) or integrated functionality in a base station B (BSC, Base Station Controller) that contains the functionality required to support location based services. The SMLC manages the overall co-ordination and scheduling of resources required for locating a device R. It also calculates the final location estimate and estimates the achieved accuracy. The SMLC may control a number of Location Measurement Units (LMU) for the purpose of obtaining radio interface measurements to locate or help locate the mobile station subscribers in the area that it serves.

Figure 2:
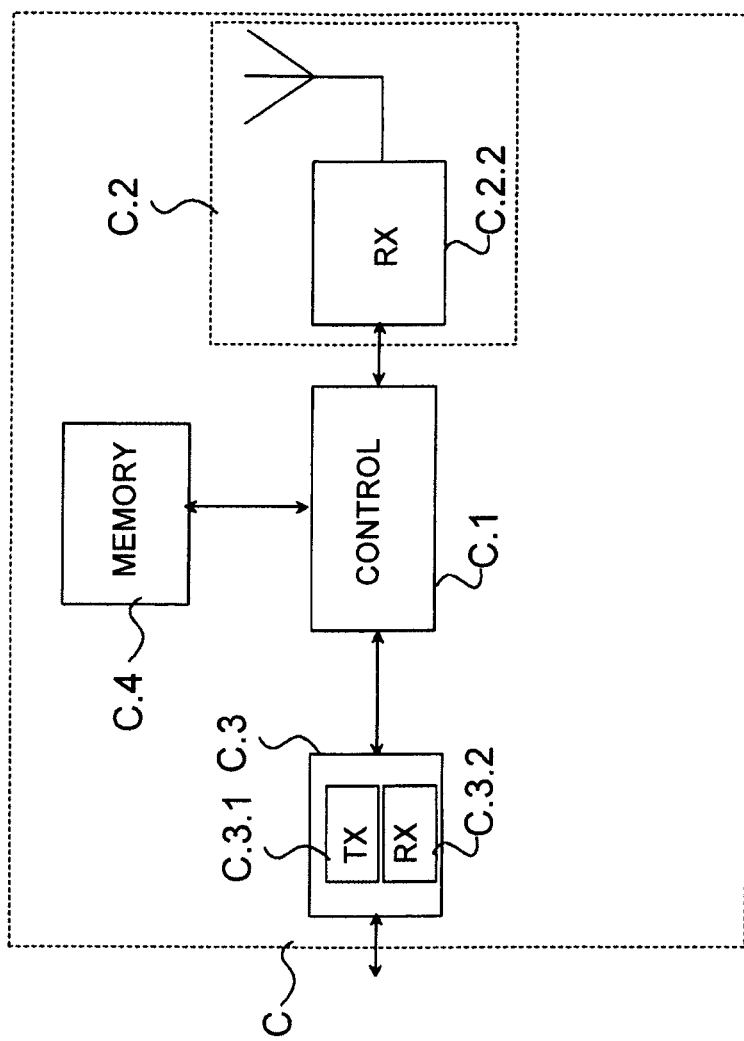
FIG. 2 depicts a reference receiver of a navigation system according to an example embodiment of the present invention as a simplified block diagram.

Now, the main elements of an example embodiment of the reference receiver C.2 will be described in more detail with reference to FIG. 2. The disclosure is applicable to both the reference receiver C of the first navigation system and the reference receiver C" of the second navigation system, although practical implementations may be different from each other. The reference receiver C.2 comprises a controller C.1 for controlling the operation of the reference receiver C.2. The controller C.1 comprises e.g. a processor, a microprocessor, a digital signal processor (DSP) or a combination of these. It is obvious that there can also be more than one processor, microprocessor, DSP, etc. in the controller C.1. There is also a receiver C.2.2 for receiving signals from the satellites S1, S2 of the navigation system. The reference receiver C.2 further comprises a communication block C.3 for communicating, either directly or indirectly, with the network element M of the communications network P. The communication block C.3 comprises a transmitter C.3.1 for transmitting signals to the network element M and, if necessary, a receiver C.3.2 for receiving signals transmitted by the network element M to the reference receiver C.2. The reference receiver C.2 may also comprise memory C.4 for storing data and software (computer program code).

Figure 3:
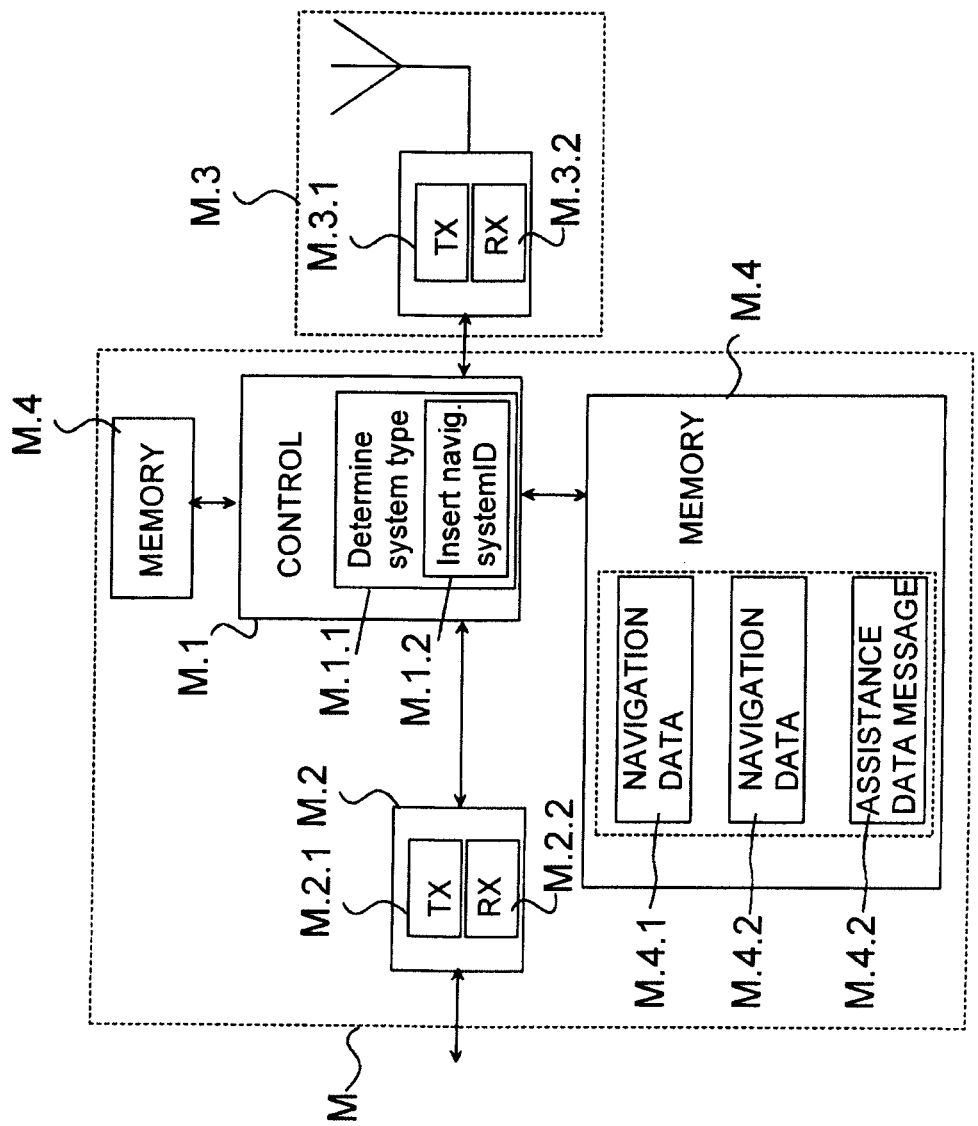
FIG. 3 depicts a network element according to an example embodiment of the present invention as a simplified block diagram.

The structure of an example embodiment of the network element M is depicted in FIG. 3. The network element M comprises a controller M1. Also the controller M.1 of the network element may be constructed of a processor, a microprocessor, a digital signal processor (DSP) or a combination of these. It is obvious that there can also be more than one processor, microprocessor, DSP, etc. in the controller M.1. The network element M can communicate with the network element C.2 by the first communication block M.2. The first communication block M.2 comprises a receiver M.2.2 for receiving signals from the reference receivers C.2 of the navigation systems. The first communication block M.2 may also comprise a transmitter M.2.1 for transmitting e.g. request messages to the reference receiver C.2 of the navigation system. The network element M further comprises a second communication block C.3 for communicating with the base stations B or other access points of the communications network P. The second communication block M.3 comprises a transmitter M.3.1 for transmitting signals to the base stations B and a receiver M.3.2 for receiving signals transmitted by the base stations B to the network element M. The network element M also comprises memory M.4 for storing data and software (computer program code).

The network element M obtains the assistance data either from satellite broadcasts by using a reference receiver C.2 or some other external solution, e.g. from an assistance data server X intended to gather and transmit such information to communications networks. The assistance data server X comprises analogous elements with the network element M with respect to the operations relating to the receiving navigation data, forming and transmitting the assistance data (i.e. the receiver M.2.2, the controller M.1, the transmitter M.3.1, the memory M.4). The assistance data server X may also comprise elements of the reference receiver C.2. The assistance data server X is, for example, a server of a commercial service provider from who assistance data can be requested, maybe against a fee.

The reference receiver C.2 is not necessarily a separate device located outside the communications network P but can also be a part of the network element M.

In another example embodiment the assistance data server X can also analyse signals received by the reference receiver C.2 (which can also be part of the assistance data server X) and determine whether a signal/satellite is operating properly or not.

Figure 4:
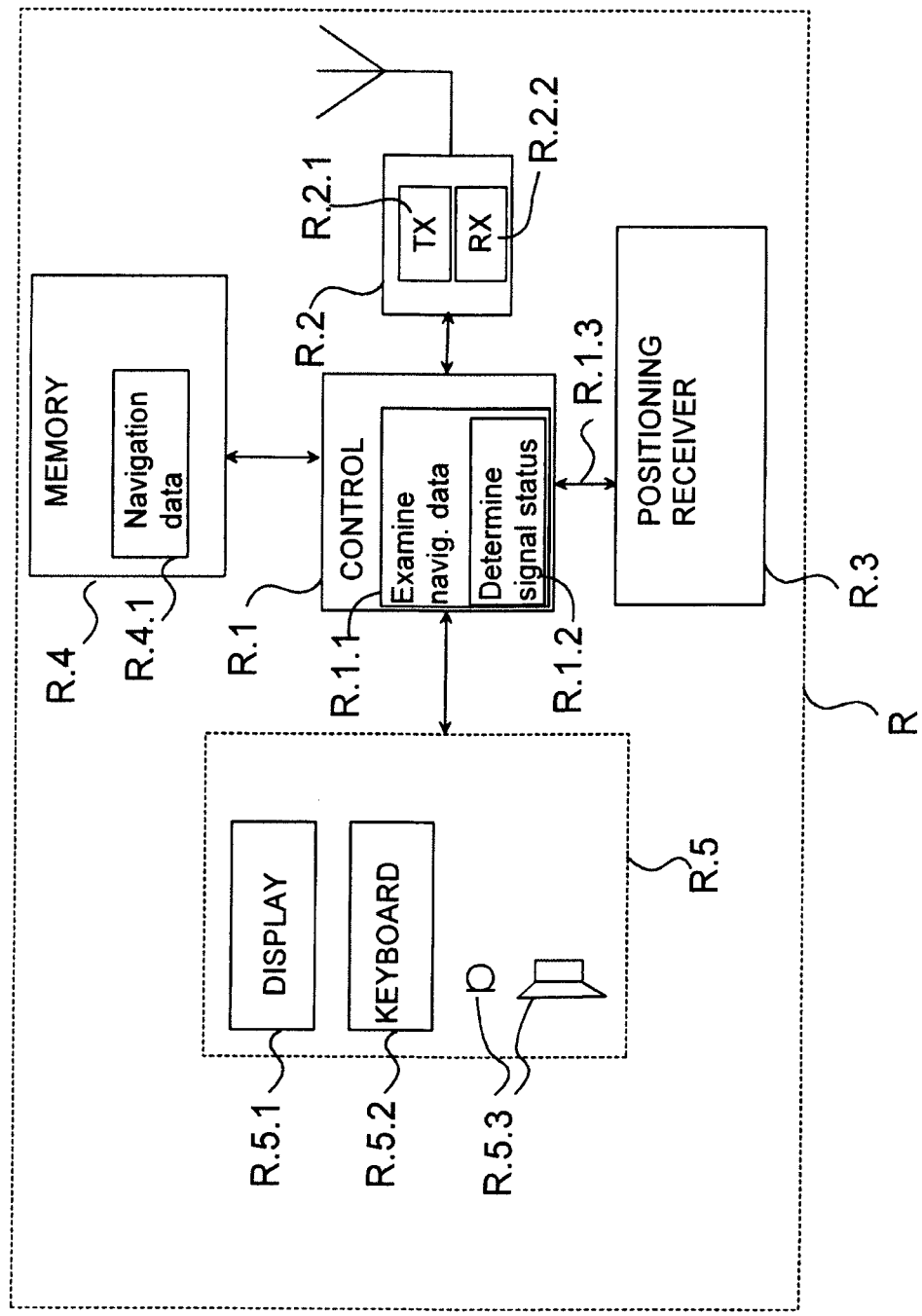
FIG. 4 depicts a device according to an example embodiment of the present invention as a simplified block diagram.

FIG. 4 depicts a device R according to an example embodiment of the present invention as a simplified block diagram. The device R comprises one or more positioning receivers R.3 for receiving signals from the reference stations S1, S2 of one or more navigation systems. There can be one positioning receiver R.3 for each navigation system the device R is intended to support, or it may be possible to use one positioning receiver R.3 for performing positioning on the basis of signals of more than one navigation system. The device R also comprises a controller R.1 for controlling the operation of the device R. Again, the controller R.1 of the network element may be constructed of a processor, a microprocessor, a digital signal processor (DSP) or a combination of these. It is obvious that there can also be more than one processor, microprocessor, DSP, etc. It is also possible that the positioning receiver R.3 can comprise a controlling element R.3.1 (e.g. a processor, a microprocessor and/or a DSP), or the positioning receiver R.3 uses the controller of the device R in positioning. It is also possible that some of the positioning operations are carried out by the controlling element R.3.1 of the positioning receiver R.3 and some other positioning operations are carried out by the controller R.1 of the device. The device R can communicate with a base station B of the communications network P by the communication block R.2. The communication block R.2 comprises a receiver R.2.2 for receiving signals from the base station B of the communications network P. The communication block M.2 also comprises a transmitter R.2.1 for transmitting messages to the base station B of the communications network P. Data and software can be stored to the memory R.4 of the device. The device R is also provided with a user interface R.5 (UI) which comprises, for example, a display R.5.1, a keypad R.5.2 (and/or a keyboard), and audio means R.5.3, such as a microphone and a loudspeaker. It is also possible that the device has more than one user interface.

The device R is, for example, a mobile communication device intended to communicate with the communications network P as is known as such. The user interface R.5 can be common to both the mobile communication part and the positioning receiver R.3.

In the following, a non-limiting example of fields of the Real-Time Integrity information element will be disclosed with reference to the Table 1. In the Table 1, associated bit counts are shown. According to the present invention, The Real-Time Integrity field is intended to be used to communicate the satellite health data to the device R.

TABLE 1

| Parameter | # Bits | Scale Factor | Range | Units | Incl. |
|---|---|---|---|---|---|
| The following field occurs once per message | | | | | |
| UTC | 32 | 1 | $0-(2^{32}-1)$ | sec | M |
| The following field occurs once per signal (NBS times) | | | | | |
| Bad_SSS_ID | 14 | 1 | — | — | C |

The Real-Time Integrity field of the GNSS Assistance Data Information Element contains parameters that describe the real-time status of the GNSS constellations. Primarily intended for non-differential applications, the real-time integrity of the satellite constellation is of importance as there is no differential correction data by which the device R can determine the soundness of each satellite signal. The Real-Time Satellite Integrity data communicates possible abnormalities in the operation of the satellite(s) of the GNSS constellations to the device R in real-time or almost real-time. The network element M shall always transmit the Real Time Integrity field with the current list of unhealthy signals, for any A-GNSS positioning attempt and whenever A-GNSS assistance data is sent. If the number of bad signals (NBS) is zero, then the Real Time Integrity field shall be omitted. When the Extended Reference IE is included in the RRLP Measure Position Request message or in the RRLP Assistance Data message, then the MS shall interpret the absence of a Real Time Integrity field in the assistance data provided by the SMLC to mean that the number of bad signals is zero. If the Extended Reference IE is not present, this interpretation applies when the assistance data is provided by the network element M following a previous request of the device R for Real Time Integrity data.

The UTC field indicates the UTC time (Universal Time, Coordinated) when the list was generated.

The NBS value indicates the number of SSS ID's that follow that the device R should not use at this time in a position fix. This NBS value is determined from the Bad_SSS ID list.

The Bad_SSS ID field is used to indicate the system, satellite index SSS ID, SV/Slot and Signal ID of the satellite signal which is not functioning properly. Because the indication contains information on the satellite system, the Bad_SSS ID field can be generally used to indicate the different positioning signals in the different satellites and different satellite systems. The SSS ID is a 14-bit field divided to 3 subfields which are as follows:

The first three bits form the System ID field, which contains the ID number of the satellite system;

the next six bits form the SV/Slot ID field, which contains the index of the satellite in the system; and the last five bits form the Signal ID field, which contains the ID number of the positioning signal The bit mask for SSS ID is the following:

System ID (3 bits, range 0 . . . 7): xxx-----------

SV/Slot ID (6 bits, range 0 . . . 63): ---xxxxxx-----

Signal ID (5 bits, range 0 . . . 31): ---------xxxxx

The System ID specifies the satellite system that the satellite and signal belong to. In the current version of this interface the following systems are supported: GPS, Galileo and SBAS, GLONASS, QZSS and LAAS (pseudolite). In Table 2 the correspondence between the system and the value of the System ID field is depicted.

TABLE 2

| System ID | Indication |
| --- | --- |
| GPS | 0 |
| SBAS (e.g. WAAS, EGNOS) | 1 |
| Galileo | 2 |
| GLONASS | 3 |
| QZSS | 4 |
| LAAS | 5 |
| Reserved for future use | 6 |
| Reserved for future use | 7 |

The SV ID is an index number for a satellite within a satellite system. The SV_ID has a value range: 0-63. The SV ID value range starts from 0 for each satellite system. Actual PRN number for the satellite can be obtained by adding a satellite system specific offset to the SV ID value. The offsets are defined in the following table 3.

TABLE 3

| System ID | Index Offset Parameter | Value |
| --- | --- | --- |
| GPS | SV_BASE_GPS | 1 |
| SBAS | SV_BASE_SBAS | 120 |
| Galileo | SV_BASE_GALILEO | 1 |
| GLONASS | SV_BASE_GLONASS | 1 |
| QZSS | SV_BASE_QZSS | TBD |
| LAAS | SV_BASE_LAAS | TBD |

In the case of GLONASS, SV ID refers to orbit Slot Number of a specific satellite.

However, it is also possible to use other implementations than the above mentioned to indicate the information relating to non-properly working signals.

The Signal ID specifies one satellite-positioning signal from the different signals output by a satellite. An ANY value is used in signal ID when a specific satellite is selected without specifying any signal. This is needed e.g. in real time integrity information element when reporting integrity failure for a satellite rather than a failure for a specific signal.

TABLE 4

| Signal ID | Indication |
| --- | --- |
| Any | 0 |
| GPS_L1_CA | 1 |
| GPS_L2C (data) | 2 |
| GPS_L2C (pilot) | 3 |
| GPS_L5 (data) | 4 |
| GPS_L5 (pilot) | 5 |
| GALILEO_L1-B (data) | 6 |
| GALILEO_L1-C (pilot) | 7 |
| GALILEO_E5A (data) | 8 |
| GALILEO_E5A (pilot) | 9 |
| GALILEO_E5B (data) | 10 |

TABLE 4-continued

| Signal ID | Indication |
| --- | --- |
| GALILEO_E5B (pilot) | 11 |
| GLONASS L1 | 12 |
| GLONASS L2C | 13 |
| Reserved for future use | 14-31 |

The navigation system assistance data message contains also other fields and information elements than the real time integrity information element. However, they are not important in view of the present invention and it is not necessary to discuss them in more detail here.

When there is a necessary to transmit the navigation system assistance data message in the communications network, e.g. from the network element M to the device R, the information is mapped into one or more messages applicable in the communications network. For example, in GSM communications network there is a certain message delivery approach (Radio Resource LCS Protocol, RRLP) formed for transmission of location related information. This approach is defined in the standard 3GPP TS 44.031, which defines the format of the assisted GPS data exchanged between the network element M and the device R. In this invention, this approach can be used to send the more general health data to the device R.

In the network element M the available navigation information such as DGPS/DGNSS correction, ephemeris and clock correction and almanac data is mapped into corresponding fields of the assistance data message(s). The ephemeris, clock correction, almanac and other data relating to a particular satellite are obtained from a satellite navigation message of that satellite or from an external service X. The message is received by the reference receiver C or by a reference receiver in the external service module X. The assistance data message comprises a Cipher Control element to indicate if the information is ciphered or not, Ciphering Serial Number element, and Data Information Element. The Data Information Element (Data IE) carries the navigation information. The elements are depicted in Table 5 below.

The Assistance Data message is, for example, built so that it is fitted into a fixed length message not necessary occupying the whole message. It can contain three data sets: DGPS/DGNSS correction, ephemeris and clock correction, almanac and other data information. In case that the fixed length message has less information elements than bits available then the rest of the message is filled with fill bits. No undefined spare bits are usually not allowed between elements. In an example embodiment the channel to broadcast the Assistance Data message is e.g. CBCH over which the SMSCB DRX service is used. One SMSCB message has fixed information data length of 82 octets and the maximum length of GPS Assistance Data is 82 octets. The device R can identify the LCS SMSCB message with Message Identifiers declared in 3GPP TS 23.041.

TABLE 5

| Parameter | | Bits | Resol. | Range | Units | Occurrences | Presence |
| --- | --- | --- | --- | --- | --- | --- | --- |
| Cipher Control | Cipher On/Off | 1 | — | 0-1 | — | 1 | M |
| | Ciphering Key Flag | 1 | — | 0-1 | — | 1 | M |

TABLE 5-continued

| Parameter | Bits | Resol. | Range | Units | Occurrences | Presence |
|---|---|---|---|---|---|---|
| Ciphering Serial Number | 16 | — | 0-65535 | — | 1 | C |
| Data | 638 | — | — | — | — | M |

Figure 5:
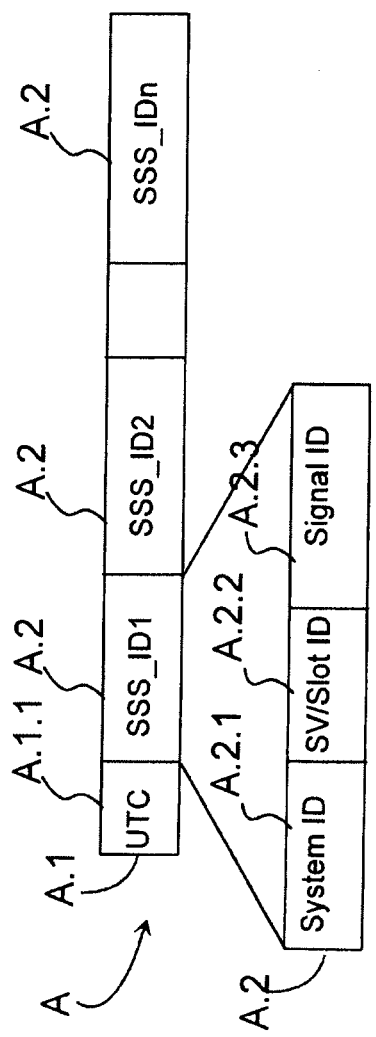
FIG. 5 depicts according to an example embodiment of the present invention.
Figure 6:
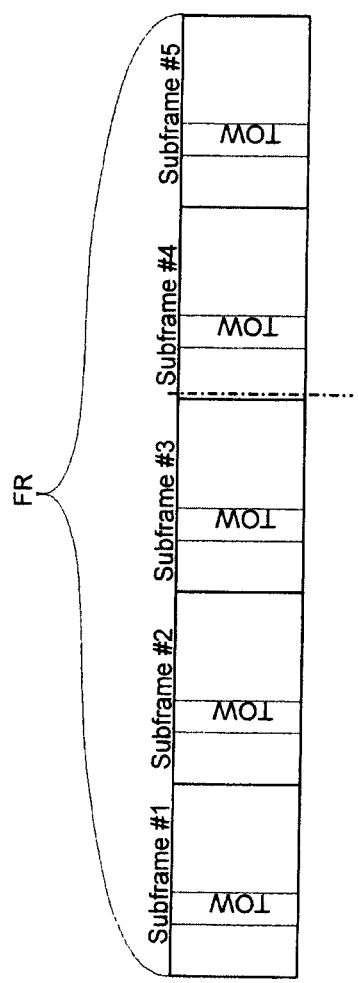
FIG. 6 shows an example of a frame structure used in the GPS system.

In FIG. 5 an example assistance message A according to an example embodiment of the present invention is shown. The message comprises the Real-Time Integrity field A.1. The Real-Time Integrity field A.1 comprises a Time field A.1.1 (UTC) and one or more Bad Signal Indication fields A.2 according to the number of non-healthy signals which should be reported to the device R. The Bad Signal Indication field A.2 contains information of the satellite to which the faulty signal belongs (A.2.2), the system the satellite belongs (A.2.1), and indication of the signal (A.2.3), which has failed. In this example embodiment the assistance message A does not contain an explicit indication of the number of failed signals but it can directly be derived from the number of Bad Signal Indication fields A.2 included in the message.

Now, an example situation on the usage of the assistance message format according to the present invention will be described in the following. The network element has storage area M.4.1 in the memory M.4 for storing navigation data received from the reference receiver C.2. If there is no navigation data stored e.g. of the satellites of the first navigation system, the controller M.1 of the network element forms a query message (not shown) and transfers it to the first communication block M.2 of the network element. The transmitter M.2.1 makes protocol conversations, if necessary, to the message and transmits the message to the reference receiver C of the first navigation system. The receiver C.3.2 of the communication block of the first reference receiver C receives the message, makes protocol conversions, if necessary, and transfers the message to the controller C.1 of the reference receiver C. The controller C.1 examines the message and determines that it is a request to transmit navigation data to the network element M. If the memory C.4 contains the requested navigation data, it can be transmitted to the network element M, unless there is a need to update the navigation data before the transmission.

After the navigation data is updated, the controller C.1 of the reference receiver forms a message containing the navigation data and transfers it to the transmitter C.3.1 of the second communication block of the first reference receiver C. The controller C.1 also determines if there are satellites which are not operating properly. The controller C.1 examines signals from such non-healthy satellites to determine if there are any healthy signals which can be received from that satellite. For example, the controller C.1 may perform measurements of residuals of a pseudorange and if the residual deviates from a computational residual more than a predetermined threshold, the controller C.1 determines that the satellite is not operating properly. Another option is to compare the accuracy of the ephemeris data transmitted by a satellite to a reference data. If the examination indicates that there is at least one healthy signal available from that satellite, the controller C.1 forms an indication of each of the non-healthy (i.e. failed) signals of that satellite to the assistance data message. However, if the examination indicates that all the signals from the non-healthy satellite are failed, the special indication value (=any) can be formed for that satellite. In that case there is only one Bad Signal Indication field A.2 relating to that satellite in the assistance data message.

The transmitter C.3.1 transmits, after protocol conversions if necessary, the navigation data to the network element M. The receiver M.2.2 of the network element receives the message, makes protocol conversions, if necessary, and transfers the message to the controller M.1 of the network element, or stores the navigation data received in the message directly to the memory M.4 of the network element. The memory may comprise certain areas (M.4.1, M.4.2 in FIG. 3) for storing navigation data of satellites of different navigation systems. Hence, the data is stored to the area which is reserved for the navigation system from which the navigation data was received.

The assistance data can be transmitted to the device R either by request or by a broadcast transmission, e.g. on a control channel of the communications network P. In the GSM system a GPS Assistance Data Broadcast Message format is defined which can be used in such broadcast transmissions for GPS. The assistance data is included in the message utilising the format defined in this invention. For example, the controller M.1 of the network element M examines whether there are any bad signal indications and if the examination indicates that there is at least one failed signal, the controller M.1 forms the Real-Time Integrity field A.1 and inserts into it the Bad Signal Indication field A.2 for the faulty signals/satellites. Then, the controller M.1 constructs an assistance data message comprising the Real-Time Integrity field A.1 to be transmitted to the device R.

It should be noted here that the definition of time in this assistance data format is different from the present GPS time. As mentioned earlier, for instance, GPS time rolls over every week. The new time definition does not do this. Moreover, the manner in which time is defined is not relevant from the point of view of the invention.

The controller can browse the navigation data of the first navigation system stored in the first storage area M.4.1 to form other assistance data messages to transmit other navigation data, when necessary.

When assistance data message A is formed, the assistance data message can be transmitted to the communications network. The controller M.1. transfers the data in the assistance data message storage area M.4.3 to the second communication block M.3 of the network element. The transmitter M.3.1 of the second communication block of the network element M performs the necessary operations for forming the signals for transmission carrying the assistance data, and transmits the signals to the communications network P.

The signals are received by the receiver R.2.2 of the communication block of the device R. The receiver R.2.2 demodulates the data from the received signals and e.g. transfers the data to the controller R.1 of the device R. The controller R.1 stores the data into the memory R.4 of the device R and examines (R.1.1) the assistance data. The examination comprises determining (R.1.2) the Bad Signal Indication fields A.2 (if any). As mentioned above, the device R can deduce the number of failed signals from the number of Bad Signal Indication fields A.2 included in the message. Indication on the failed signals can be transferred to the positioning receiver R.3 e.g. through the output line R.1.3 of the controller R.1. However, it is also possible that the controller R.1 is also used in the positioning operations wherein it may not be necessary to transfer the data (indication on the failed signals and/or the number of failed signals) to the positioning receiver R.3 but the controller R.1 can use the data stored in the memory R.4.

The memory R.4 can comprise a storage area R.4.1 for storing the navigation data received in the assistance data messages as well as indication of the faulty signals. Navigation data can also be received, in some circumstances, from satellites by demodulating received satellite signals.

When the assistance data is retrieved from the assistance data record(s), they can be kept in the memory and used in the positioning. For example, when the positioning receiver R.3 can only demodulate signals from one or two satellites, the positioning receiver R.3 can use the assistance data for performing the positioning as is known as such.

When the positioning receiver R.3 needs to use assistance navigation data of one or more satellites, it also examines the information relating to the real-time integrity field to determine whether there are any signals from satellites which are not working properly, and tries to use other signals/satellites instead.

The device R can perform the positioning at certain intervals, or when a predetermined condition is fulfilled. The predetermined condition can include, for example, one or more of the following situations: the user initiates to a call e.g. to an emergency centre; the user selects a positioning operation from a menu of the device R; the device R and the communications network P perform a handover to another cell of the communications network P; the communications network P sends a positioning request to the device R; etc.

It is also possible that the communications network, e.g. the network element M requests the device R to perform positioning. The request can be send using the RRLP message delivery mechanism. Also the reply can be sent using the RRLP message delivery mechanism.

When the positioning is to be performed, the positioning receiver R.3 or the controller R.1 of the device can examine whether there is enough up-to-date navigation data stored in the memory R.4. If some navigation data is not up-to-date (i.e. the navigation data has become older than a preset time), or some necessary navigation data is missing, the device can form and send a request message to the communications network P, for example to the base station B, which forwards the request message to the network element M. The network element M gathers the requested navigation data and forms a reply message. The reply message is then transmitted via the serving base station B to the device R. The receiver R.2.1 of the communication block R.2 of the device receives and demodulates the reply message to retrieve the navigation data. The navigation data is stored e.g. into the navigation data storage area R.4.1 of the memory R.4.

It should be noted that the navigation assistance message specified contains various items (specifically, $t_{oe\_}$MSB, fit interval, IOD, $t_{oc}$, $T_{GD}$, $t_{oe}$, $r_0$, $r_1$) that are, of course, important for the navigation model to function properly, but are not important from the point-of-view of this invention. For instance, the reference time for the model can be given in various ways (now, $t_{oe\_}$MSB, $t_{oc}$ and $t_{oe}$), but changing it does not affect the functionality of the transmission of the SV health indication. The parameters, which are not important from the point-of-view of the current invention, are only given for the sake of completeness.

Also, it should be emphasized that the actual bit counts and scale factors are subject to change, if new specifications or clarifications should appear. Changing the bit counts and/or scale factors does not change the spirit of the invention. For instance, adding resolution to velocity components would not be a different invention. As a yet another example, consider the SS ID. The indexing method currently used in standards is able to differentiate only between GPS satellites. The now proposed SS ID contains information on the system and the satellite. These two can be expressed in the same field, but it is not necessary to do so (given that the system is defined in some other field). Hence, a simple modification of the fields would not, again, change the spirit of the invention.

The communications network P can be a wireless network, a wired network, or a combination of these. Some non-limiting examples of the communications networks have already been mentioned above but WLAN and WiMax networks can also be mentioned here.

The operations of the different elements of the system can mostly be carried out by software, i.e. the controllers of the elements operate on the basis of computer instructions. It is, of course, possible that some operations or parts of them can be "hard coded" i.e. implemented by hardware.

The invention claimed is:

1. A device comprising:
   a positioning receiver for performing positioning on the basis of two or more different satellite-positioning signals transmitted by a same reference station of at least one satellite navigation system, the different satellite-positioning signals being specifiable by different signal identities;
   a receiver for receiving assistance data relating to said at least one navigation system; and
   an examining element adapted to examine the received assistance data;
   wherein said examining element is adapted to examine the assistance data to find out whether the assistance data includes information on usability of at least one of said two or more different satellite-positioning signals, wherein if the assistance data comprises information relating to the usability of at least one satellite-positioning signal, said examining element is further adapted to examine said information to find out an indication of the reference station to which said at least one satellite-positioning signal relates and the signal identity of said at least one satellite-positioning signal,
   wherein the device is adapted not to use in the positioning such satellite-positioning signal which is indicated not to be usable.

2. A device according to claim 1, wherein said information relating to the usability is transmitted in a message comprising a Real-Time Integrity field, wherein said examining element is adapted to examine the Real-Time Integrity field to determine the number of satellite-positioning signals indicated not to be usable and the identity of satellite-positioning signals indicated not to be usable.

3. A device according to claim 2, wherein said Real-Time Integrity field comprises one Bad Signal Indication field for each non-usable satellite-positioning signal, wherein said examining element comprises a determining element adapted to examine the number of Bad Signal Indication fields in the Real-Time Integrity field to determine the number of satellite-positioning signals indicated not to be usable.

4. A device according to claim 3, wherein said Bad Signal Indication field comprises said indication on the reference station the non-usable satellite-positioning signal relates to.

5. A device according to claim 4, wherein said indication on the reference station the satellite-positioning signal relates to is assigned a predetermined value to indicate that all satellite-positioning signals of one reference station are not usable, wherein said Real-Time Integrity field comprises only one Bad Signal Indication field for such a reference station.

6. A device according to claim 3, wherein said determining element is adapted to determine that all satellite-positioning signals of the navigation system are usable when the examination indicates that there are none of the Bad Signal Indication fields in the Real-Time Integrity field.

7. A device according to claim 1, wherein the positioning receiver is adapted to receive satellite-positioning signals from at least two different navigation systems.

8. A device according to claim 1, wherein said information comprises an indication of the navigation system to which the assistance data relates, wherein the examining element is adapted to examine said indication of the navigation system.

9. A device according to claim 1, wherein the device is a mobile communication device.

* * * * *